United States Patent [19]

Ausavich et al.

[11] Patent Number: 5,191,843
[45] Date of Patent: Mar. 9, 1993

[54] PALLET WITH MOLDED PLASTIC PALLET SPACER FEET

[75] Inventors: Timothy C. Ausavich; Kevin P. Gohr, both of Sheboygan, Wis.; Glyn Carver, Deerfield, Ill.

[73] Assignee: Asaa Technologies, Inc., Sheboygan, Wis.

[21] Appl. No.: 813,081

[22] Filed: Dec. 24, 1991

[51] Int. Cl.⁵ .................................. B65D 19/12
[52] U.S. Cl. .................................. 108/56.3; 108/56.1
[58] Field of Search .................. 108/56.3, 56.1, 51.1, 108/51.3

[56] References Cited

U.S. PATENT DOCUMENTS

| | | | |
|---|---|---|---|
| 2,922,606 | 1/1960 | Glassman et al. | 108/56.1 |
| 3,106,174 | 10/1963 | Newton | 108/51.1 |
| 3,563,183 | 2/1971 | Rich | 108/51 |
| 3,598,065 | 8/1971 | Young | 108/53 |
| 3,605,651 | 9/1971 | Stewart | 108/51 |
| 3,610,172 | 10/1971 | Wharton | 108/51 |
| 3,691,964 | 9/1972 | Larson | 108/51 |
| 3,804,032 | 4/1974 | Baucom | 108/51 |
| 3,910,202 | 10/1975 | Skahan | 108/51 |
| 3,915,099 | 10/1975 | Wies | 108/56 |
| 4,267,781 | 5/1981 | Powers | 108/56.3 X |
| 4,292,900 | 10/1981 | Bula | 108/51.1 |
| 4,425,852 | 1/1984 | Riviere | 108/56.3 |
| 4,671,188 | 6/1987 | Betro | 108/56.3 |
| 4,955,940 | 9/1990 | Welleman | 108/56.1 |

FOREIGN PATENT DOCUMENTS 732022 4/1966 Canada ..................... 108/56.1

Primary Examiner—José V. Chen
Attorney, Agent, or Firm—Robert T. Johnson

[57] ABSTRACT

Re-usable or multi use pallets are disclosed, which comprise a pallet platform mounted on molded plastic pallet spacer feet, and pallet runners attached to the bottom or underside of the pallet spacer feet by means of a through bolt extending through the pallet platform, pallet spacer foot, and pallet runners, and nails extending upward through the pallet runner and into the bottom of the molded plastic spacer foot. The plan view of the pallet spacer foot is of a modified oblate spheroid shape.

6 Claims, 4 Drawing Sheets

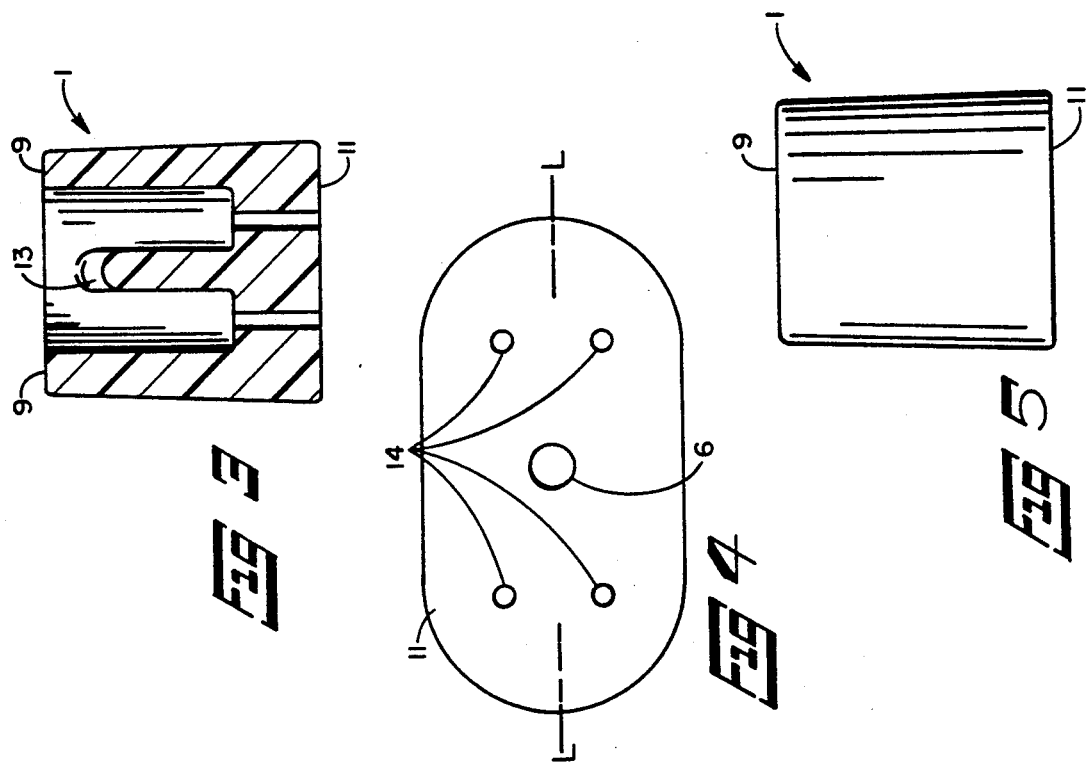
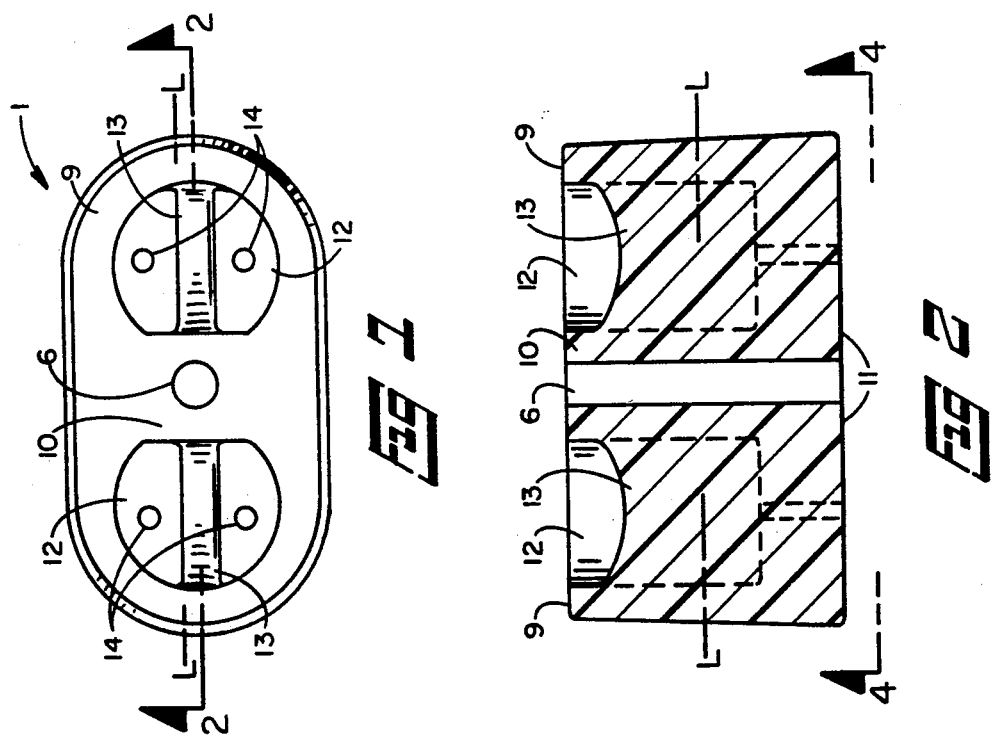

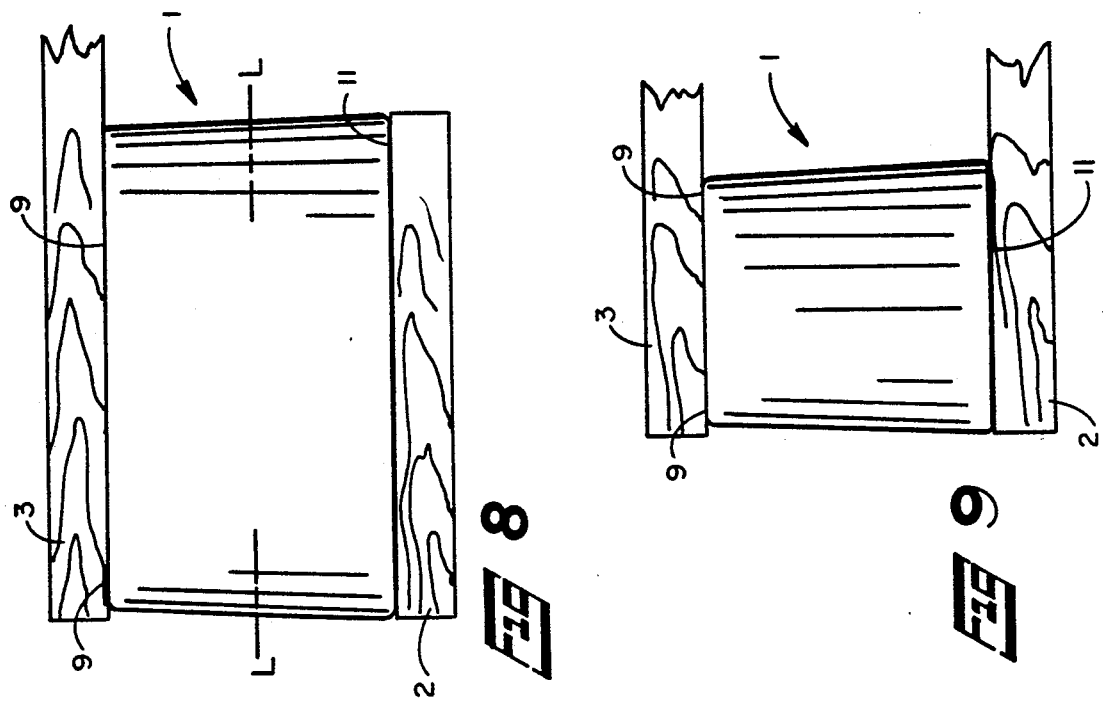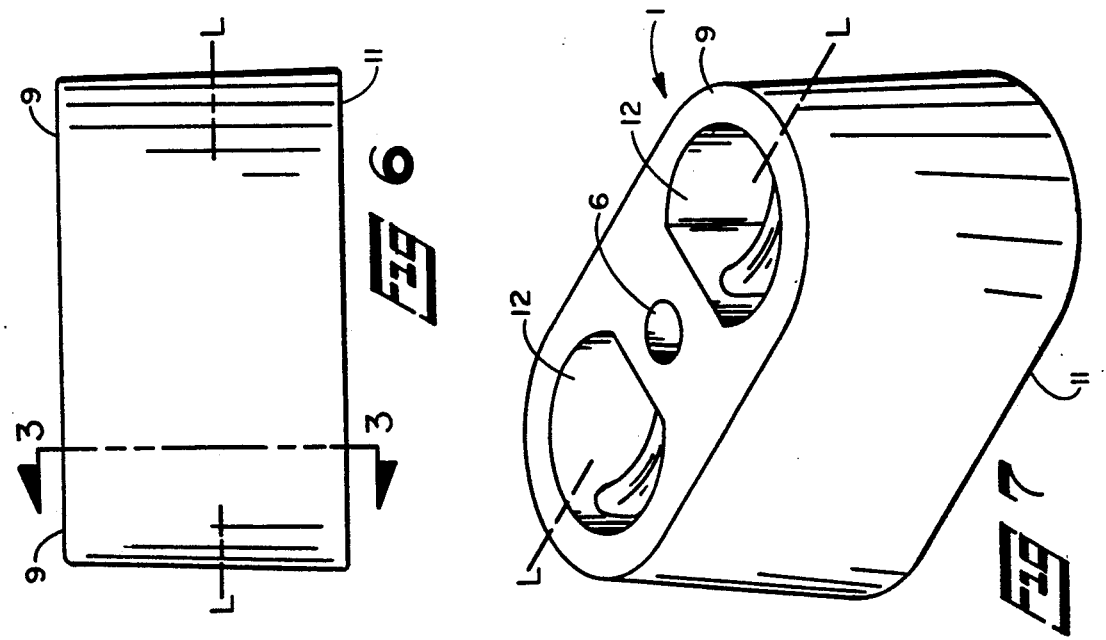

PALLET WITH MOLDED PLASTIC PALLET SPACER FEET

FIELD OF INVENTION

This invention pertains to pallets and in particular to spacer feet molded of plastic, and means for attachment to the pallet platform and runner boards.

BACKGROUND OF THE INVENTION

Much effort has been spent on making expendable pallets, however in view of disposal of once used pallets there is considerable interest in re-usable pallets, which in turn are more costly than the expendable pallets, however in view of the re-use or multi-use the cost per use is competitive with the expendable pallets.

Re-usable pallets help protect the environment by reduction of scrap, which is a problem with expendable pallets.

PRIOR ART DISCLOSURE

U.S. Pat. No. 3,563,183 for Pallet Construction.

Disclosure is made in this patent of a pallet including spaced decks and tubular legs mounted on the decks by means of flanges.

U.S. Pat. No. 3,598,065 for Pallet Structure With Self Locking Legs.

Disclosure is made in this patent of legs shaped like the frustum of a cone and a flange on each of the legs.

U.S. Pat. No. 3,605,651 for Disposable Pallet.

U.S. Pat. No. 3,610,172 for Pallet Construction.

This patent discloses a pallet foot consisting of two separate components.

U.S. Pat. No. 4,671,188 for Foot For Expendable Pallet.

Disclosure is made in this patent of cup-like feet and a flange for attachment to the pallet platform.

Other U.S. patents of interest in this field are: U.S. Pat. Nos. 3,691,964, 3,804,032, 3,910,202, 3,915,099, 4,425,852.

OBJECTS OF THE INVENTION

One of the objects of this invention is to disclose a pallet having a platform and pallet spacer feet attached to the platform and pallet runners attached to the bottom of the pallet spacer feet and the pallet spacer feet comprising a plastic molding having a plan view shape of a modified oblate spheroid and these feet having a solid flat base, with the top of the feet having an outer rim and a central vertical section extending from the bottom of the foot to the top surface of the foot, and this vertical section being flush with the outer rim, and vertical hollow cylindrical sections, extending upwards from the base, one on each side of the central vertical section, and the pallet spacer foot attached to the platform and the pallet runner and fastening the pallet spacer foot to the platform and pallet runner by means of a through bolt extending through the platform, pallet spacer foot and pallet runner and a threaded nut attached to the through bolt.

Another object of this invention is to disclose pallet spacer feet of a modified oblate spheroid shape, molded of thermoplastic compound such as a polyolefins and a filler. Polypropylene and wood flour filler would be suitable.

Another object of this invention is to disclose molded plastic pallet spacer feet, having a modified oblate spheroid shape attached to a pallet platform and pallet runners by means of a through bolt, and nails extending upward from the pallet runners and into the pallet spacer foot, and the nails located one on each side of the center vertical segment of the pallet spacer foot.

A further object of this invention is protection of the environment on disclosing multi-trip, or re-usable pallets. Further the molded plastic pallet spacer foot can be a product of recycling or utilization of plastic scrap and filler, such as wood particles or wood flour. In case of broken molded plastic pallet spacer feet, these can be ground up, for re-molding into the pallet spacer feet.

BRIEF DESCRIPTION OF DRAWINGS

FIG. 1-Plan view of top of pallet spacer foot.

FIG. 2-Cross section side elevation view of pallet spacer foot.

FIG. 3-Cross section elevation end view of pallet spacer foot. (see FIG. 6)

FIG. 4-Plan view of bottom of pallet spacer foot.

FIG. 5-End elevation view of pallet spacer foot.

FIG. 6-Side elevation view of pallet spacer foot.

FIG. 7-Perspective view from top of pallet spacer foot.

FIG. 8-Elevation side view of pallet spacer foot mounted in pallet section.

FIG. 9-End elevation view of pallet spacer foot mounted in pallet section.

DETAILED DESCRIPTION OF DRAWINGS

FIG. 1-Plan view of top of pallet spacer foot.
1-Pallet spacer foot.
6-Bolt hole
9-Top of pallet spacer foot.
10-Central vertical section.
12-Hollow cylindrical segments.
13-Reinforcing web.
14-Drain holes in bottom of pallet spacer foot.

FIG. 2-Cross section side elevation view of pallet spacer foot.
1-Pallet spacer foot.
6-Bolt hole.
9-Top of pallet spacer foot.
10-Central vertical section.
11-Bottom of pallet spacer foot.
12-Hollow cylindrical segments.
13-Reinforcing web section.

FIG. 3-Cross section elevation end view of pallet spacer foot. (see FIG. 6)
1-Pallet spacer foot.
9-Top of pallet spacer foot.
11-Bottom of pallet spacer foot.
13-Reinforcing web section.

FIG. 4-Plan view of bottom of pallet spacer foot.
1-Pallet spacer foot.
6-Bolt hole.
11-Bottom of pallet spacer foot.

Figure 10:
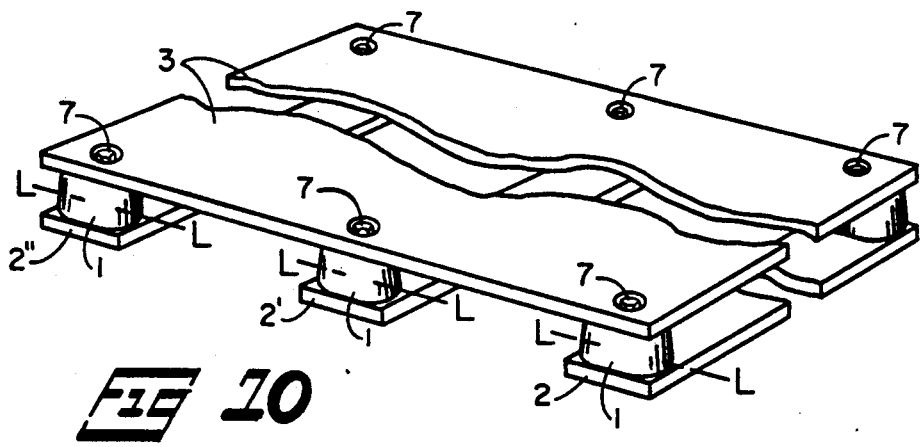
FIG. 10-Perspective elevation view of assembled pallet.
Figure 11:
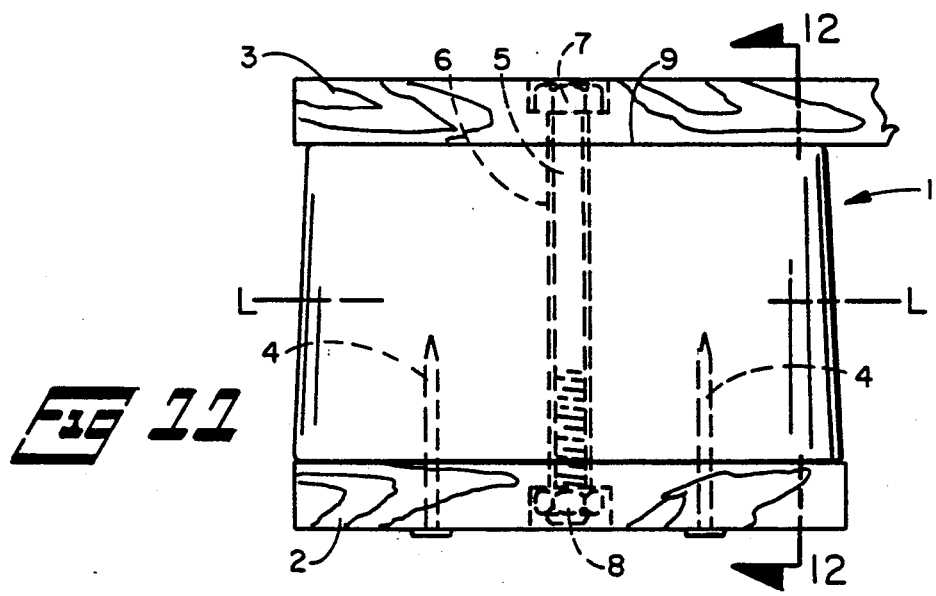
FIG. 11-Enlarged elevation segment view of side of pallet spacer foot mounted in pallet.
Figure 12:
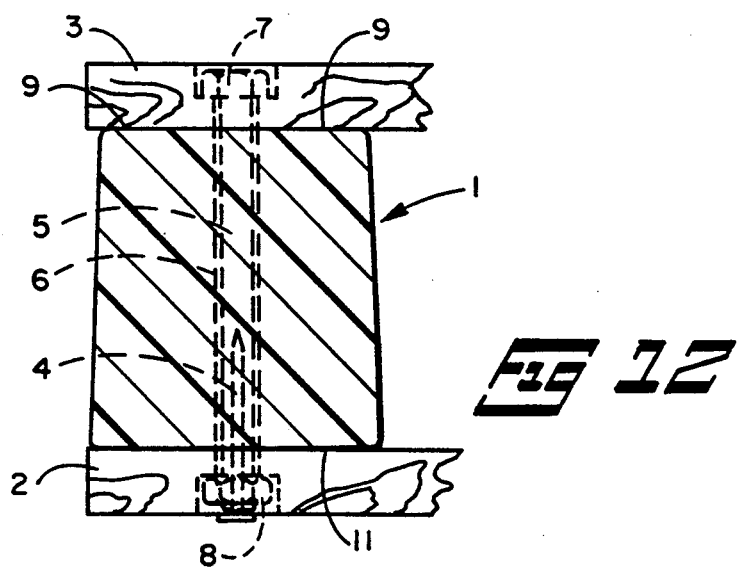
FIG. 12-Enlarged elevation segment view of edge of pallet spacer foot mounted in pallet.
Figure 13:
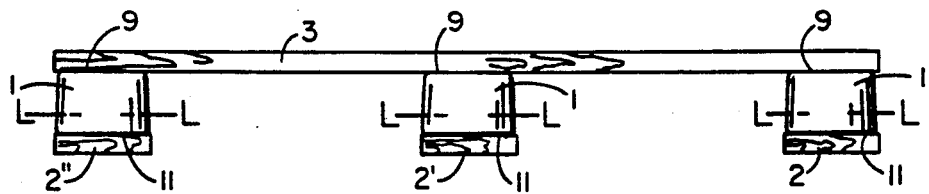
FIG. 13-Elevation view of assembled pallet.
Figure 14:
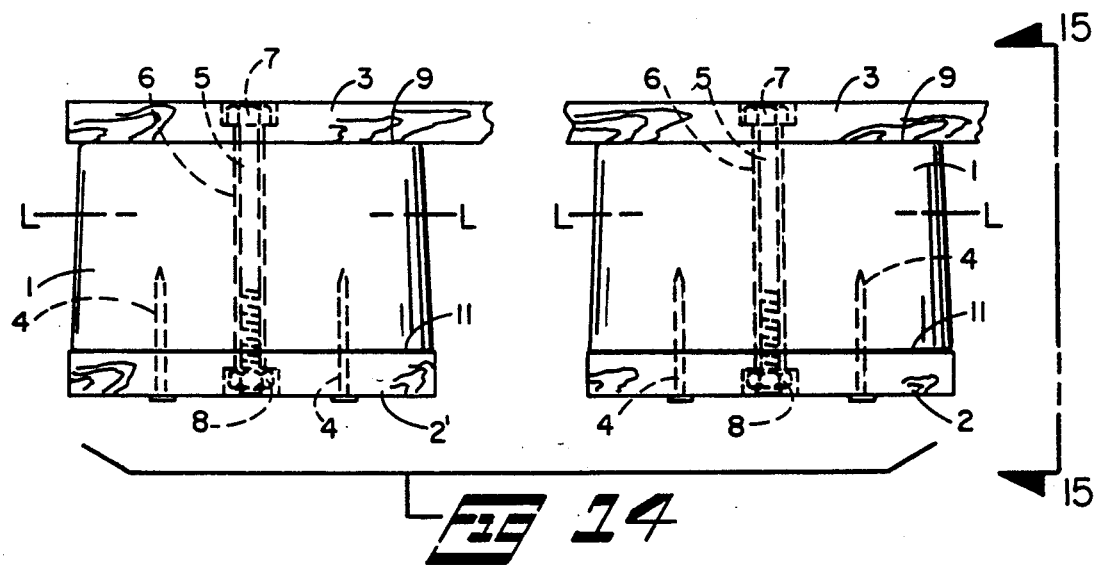
FIG. 14-Enlarged elevation side view of pallet spacer foot mounted in pallet.
Figure 15:
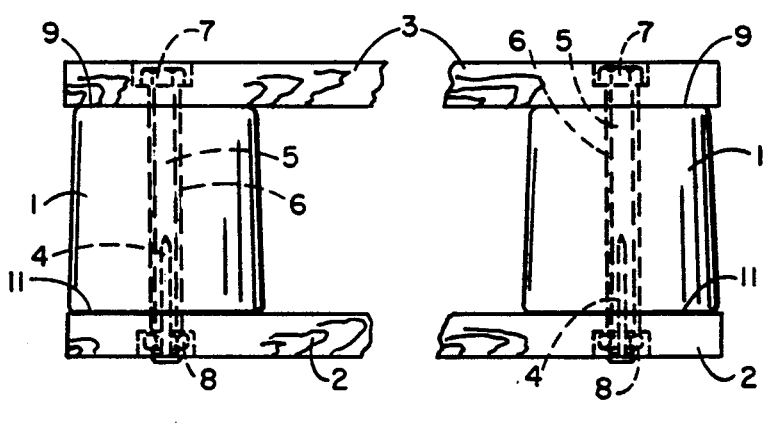
FIG. 15-Enlarged elevation edge view of pallet spacer feet mounted in pallet.

14-Drain holes in bottom of pallet spacer foot.
L—L-Long axis of pallet spacer foot
FIG. 5-End elevation view of pallet spacer foot.
1-Pallet spacer foot.
9-Top of pallet spacer foot.
11-Bottom of pallet spacer foot.
FIG. 6-Side elevation view of pallet spacer foot.
1-Pallet spacer foot.
9-Top of pallet spacer foot.
11-Bottom of pallet spacer foot.
FIG. 7-Perspective view from top of pallet spacer foot
L—L-Long axis of pallet spacer foot.
1-Pallet spacer foot.
6-Bolt hole.
9-Top of pallet spacer foot.
10-Central vertical section.
11-Bottom of pallet spacer foot.
12-Hollow cylindrical segments.
FIG. 8-Elevation side view of pallet spacer foot mounted in pallet section.
1-Pallet spacer foot.
2-Pallet spacer foot runner.
3-Pallet platform board.
9-Top of pallet spacer foot.
11-Bottom of pallet spacer foot.
FIG. 9-End elevation view of pallet spacer foot mounted in pallet section.
1-Pallet spacer foot.
2-Pallet spacer foot runner.
3-Pallet platform.
9-Top of pallet spacer foot.
11-Bottom of pallet spacer foot.
FIG. 10-Perspective elevation view of assembled pallet.
1-Pallet spacer foot.
2-Pallet spacer foot runner.
3-Pallet platform board.
7-Countersunk bolt head.
FIG. 11-Enlarged elevation segment view of side of pallet spacer foot mounted in pallet.
1-Pallet spacer foot.
2-Pallet spacer foot runner.
3-Pallet platform board.
4-nails.
5-Through bolt.
6-Bolt hole.
7-Countersunk bolt head.
8-Bolt nut (countersunk).
FIG. 12-Enlarged elevation segment view of edge of pallet spacer foot mounted in pallet.
1-Pallet spacer foot.
2-Pallet spacer foot runner.
3-Pallet platform board.
4-Nail (phantom).
5-Through bolt (phantom).
6-Bolt hole (phantom).
7-Countersunk bolt head
8-Bolt nut (countersunk).
9-Top of pallet spacer foot.
11-Bottom of pallet spacer foot.
FIG. 13-Elevation view of assembled pallet.
1-Pallet spacer feet (edge view)
2-Pallet spacer foot runner.
3-Pallet platform board.
9-Top of pallet spacer feet.
11-Bottom of pallet spacer feet.
FIG. 14-Enlarged elevation side view of pallet spacer foot mounted in pallet.
1-Pallet spacer feet.
2,2'-Pallet spacer foot runners.
3-Pallet platform board.
4-Nails (phantom).
5-Through bolt (phantom view).
6-Bolt hole (phantom view).
7-Countersunk bolt head (phantom)
8-Bolt nut countersunk (phantom)
9-Top of pallet spacer foot.
11-Bottom of pallet spacer feet.
FIG. 15-Enlarged elevation edge view of pallet spacer feet mounted in pallet.
1-Pallet spacer feet.
2-Pallet space foot runner.
3-Pallet platform board.
4-Nails (phantom).
5-Through bolt (phantom).
6-Bolt hole (phantom).
7-Countersunk bolt head (phantom)
8-Bolt nut countersunk (phantom).
9-Top of pallet spacer foot.
11-Bottom of pallet spacer foot.

The long axis L—L of the pallet spacer foot 1, is noted in the FIGS. 1, 2, 4, 6, 7, 8, 10, 11, 13, and 14, to more clearly disclose this invention, of a pallet spacer foot, and its mounting in the pallet.

DETAILED DESCRIPTION OF THE INVENTION

This invention is to disclose a pallet which is not of the expendable type, which is used for only one trip but instead this invention is for a pallet of such construction to withstand multi trips, and to be readily repaired as needed.

On referring to the drawings, the pallet of this invention can be described as a pallet platform board 3, and pallet spacer feet 1, attached to the platform board 3, and pallet runners 2 attached to the bottom of pallet spacer foot 1. The pallet spacer foot 1 comprises a plastic molding having a plan view shape of a modified oblate spheroid (see FIGS. 1, 4, and 7), and having a flat base (see FIG. 4), and the top of the pallet spacer foot (see FIGS. 1 and 7) having a top surface of an outer rim 9, and a central vertical section 10 extending from the bottom 11 of the pallet spacer foot 1, to the top surface 9 of the feet 1, and this central vertical section 10 being flush or level with the outer rim 9 and hollow cylindrical segments 12, one on each side of the central vertical section 10 on the long axis of the modified oblate spheroid of the pallet spacer foot 1, attached to the pallet platform 3 and the pallet runner 2, by means of a through bolt 5 extending through the platform board 3, pallet spacer foot bolt hole 6 and pallet runner 2, and a threaded bolt nut 8, counter sunk in the pallet spacer foot runners 2, attached to the through bolt 5.

The pallet spacer feet 1 have a plan view shape of a modified oblate spheroid shape (see FIGS. 1, 4, and 7) and are molded of a thermoplasic polyolefin such as polypropylene or polyethylene and wood particles or wood flour filler. The polyolefin may be recovered scrap, such as bottles etc.

In FIG. 14, legends 2 and 2', indicate individual runners in this exploded drawing. Individual runners 2 are shown in FIGS. 10 and 13 of complete assembly in elevation.

The molded plastic pallet spacer feet 1, are attached to the pallet platform board 3, and pallet runners 2, by means of a through bolt 5 and nails 4 extending upward from the pallet runners 2, (see FIGS. 11, 12, and 14) and into the pallet spacer feet 1, and the nails 4 are located, one on each side of the central vertical section 10, and extending through the bottom 11, of pallet spacer foot 1, and into the hollow cylindrical segments 12, on each side of the central vertical section 10, and further the nails 4 are mounted between the middle and edge of the width of the pallet runners 2, through the base or bottom of pallet spacer foot 11.

In this discussion the words "foot" and "feet" and "base" and "bottom", pertaining to "pallet spacer foot" are used interchangibly.

The through bolt 5 used in this assembly has a head which is counter sunk 7 in the pallet platform board 3, and the bolt nut 8 recessed or counter sunk in pallet spacer foot runners 2.

The reinforcing web 13 section extends from the central vertical section 10, to the inner surface of the edge section of the pallet spacer foot 1, and further the web section 13 extends upward from the bottom of the spacer foot 1, for a distance of from one third to full height of the spacer foot.

The nails of this invention are mounted as described to hold the runners rigid, and to prevent warpage of these components.

The pallet spacer feet, of a modified oblate spheroid plan shape, as shown in FIGS. 1, 2, 4, 6, and 7, are mounted in a pallet such that the long axis of each foot is at a right angle, or perpendicular to the long axis of the runners 2. This mounting of the pallet spacer foot on the pallet platform 3, and the runners 2, allows for a four way entry of the forks of a lift truck. Further the pallet platform feet 1, molded of scrap polyolefin, not having vertical corners but having vertical curved edges as is shown in FIGS. 1, and 7, allows for sliding of the lift truck forks past the feet, should the fork hit the pallet spacer foot 1.

The pallet spacer foot, 1, is shown as having a taper which is merely to facilitate molding. This taper is not critical, or even necessary. The taper for molding may be from two to four degrees from vertical. (See FIGS. 2, 3, 5, and 6).

The hollow cylindrical segments 12, are best described as modified hollow cylindrical segments which have a flat vertical section, where each adjoin the central vertical section 10. (See FIGS. 1, and 7).

The pallet spacer feet are mounted such that the long axis of the pallet spacer feet are at right angles (90°) to the long axis of the pallet spacer foot runners, and further the long axis of the pallet spacer feet all extend in the same direction.

The term "pallet runner" is synonymous with "pallet spacer foot runner", and these terms may be used one for the other.

The long axis of the pallet spacer foot is shown in FIGS. 4 and 7, and further the long axis of the pallet spacer feet 1, all extend in the same direction when mounted in the pallet assembly, as these pallet spacer feet 1, are mounted at right angles, or crossways to the long axis of the width of the pallet spacer foot runners 2.

In FIGS. 10 and 13 the pallet spacer foot runners 2, are further identified as 2,2' and 2" to indicate each runner is separate, each from the others.

Having described my invention, I claim:

1. A pallet having a platform, feet, and runners wherein the improvement comprises;
   a. pallet spacer feet comprising a plastic molding having a substantially oblate spheroid plan shape and
   b. said pallet spacer feet having a solid flat base and
   c. said pallet spacer feet having a top surface and a bottom surface, a central vertical section extending from said top surface to said bottom surface and a reinforcing web extending from said bottom of said spacer feet to one third to full height of said pallet spacer feet and
   d. hollow substantially cylindrical segments extending from said top to said bottom adjoining to and on each side of said central vertical section of said pallet spacer feet and
   e. said reinforcing web spanning a portion of said substantially cylindrical segments of said pallet spacer feet and
   f. said pallet spacer feet attached to said platform and extending to a pallet spacer foot runner and
   g. said pallet spacer feet having a long axis of said pallet spacer feet mounted at right angles to a long axis of said pallet spacer feet runner and,
   h. fastening of said pallet spacer feet to said platform and said pallet spacer foot runner by means of a through bolt extending from said pallet platform, through said pallet spacer foot and through said pallet spacer foot runner and
   i. a threaded nut attached to said through bolt and
   j. nails extending upward through said pallet spacer foot runner and through the bottom of said pallet spacer foot and into each of said substantially cylindrical segments of each of said pallet spacer feet.

2. A pallet spacer foot consisting of a thermoplastic molding of a substantially oblate spheroid plan shape having a long axis, and a bolt extending vertically through a central vertical section and said central vertical section extending from a top surface to the bottom surface of said pallet spacer foot, and hollow substantially cylindrical sections on each side of and adjoining to said central vertical section and a reinforcing web spanning a portion of said substantially cylindrical sections and extending from said bottom of said spacer foot from one third to full height of said pallet spacer feet, and said pallet spacer foot attached to a platform board, by means of a bolt extending through said platform board, and a through bolt hole extending vertically through said central vertical section of said pallet spacer foot, and through a pallet spacer foot runner at the bottom of said pallet spacer foot and said long axis of said pallet spacer foot at right angles to the long axis of said pallet spacer foot runner, and nails extending upwards through said pallet spacer foot runner and into the bottom of said pallet spacer foot and into each hollow substantially cylindrical segments of each of said pallet spacer feet.

3. A pallet of claim 1, wherein the pallet spacer feet are molded of thermoplastic polyolefin material selected from the group consisting of polyethylene and polypropylene.

4. A pallet of claim 1, wherein the the improvement comprises pallet spacer feet attached to said platform and said pallet runners by means of a through bolt and nails extending upwards through said pallet runners and into said pallet spacer feet.

5. A pallet of claim 1, wherein the improvement comprises said nails located one on each side of said bolt connecting said pallet runner and said pallet spacer feet and said nails extending into said substantially cylindrical sections of said pallet spacer foot and said nails located one on each side of the through bolt between the center and the edge of the width of said runner.

6. A pallet spacer foot of claims 1, or 2, wherein the improvement comprises drain holes extending through pallet spacer foot bottom of each substantially cylindrical section.

* * * * *